United States Patent [19]

Repp

[11] Patent Number: 5,448,884
[45] Date of Patent: Sep. 12, 1995

[54] MECHANICAL LOCK FOR JET ENGINE THRUST REVERSER

[75] Inventor: Timothy O. Repp, Renton, Wash.

[73] Assignee: The Boeing Company, Seattle, Wash.

[21] Appl. No.: 148,247

[22] Filed: Nov. 8, 1993

Related U.S. Application Data

[63] Continuation of Ser. No. 947,618, Sep. 21, 1992, abandoned.

[51] Int. Cl.6 .............................................. F02K 1/62
[52] U.S. Cl. ..................................... 60/223; 60/226.2; 239/265.31
[58] Field of Search ............... 60/226.2, 223, 230, 60/232; 239/265.19, 265.29, 265.31; 244/110 B

[56] References Cited

U.S. PATENT DOCUMENTS

| | | | |
|---|---|---|---|
| 3,621,763 | 11/1971 | Geyer | 92/17 |
| 4,383,647 | 5/1983 | Woodruff et al. | 239/265.11 |
| 4,543,783 | 10/1985 | Greune et al. | 60/226.2 |
| 4,586,329 | 5/1986 | Carlin | 60/226.2 |

*Primary Examiner*—Richard A. Bertsch
*Assistant Examiner*—William Wicker
*Attorney, Agent, or Firm*—Robert H. Sproule

[57] ABSTRACT

A mechanical lock for an airplane engine thrust reverser is connected to an actuator for the thrust reverser sleeve. The mechnical lock includes an electrically operated solenoid which moves a locking pin between an unlocked position and a locked position. When the pin is in the locked position, it engages a toothed wheel which is mounted about a shaft which engages a drive gear for the thrust reverser actuator. In this manner, movement of the thrust reverser sleeve is prevented until commanded operation of the thrust reverser whereby the locking pin is moved to the unlocked position.

7 Claims, 7 Drawing Sheets

MECHANICAL LOCK FOR JET ENGINE THRUST REVERSER

This is a continuation of application Ser. No. 07/947,618 filed Sep. 21, 1992, now abandoned.

TECHNICAL FIELD

The present invention pertains to a locking mechanism for a thrust reverser of a airplane jet engine.

BACKGROUND OF THE INVENTION

A jet engine thrust reverser operates to redirect either engine exhaust gases or engine fan air in a lateral and/or forward direction to aid in slowing an airplane during landing rollout. Typically, thrust reverser operation is initiated by the pilot once the airplane has touched down on the runway during landing. Redirection of the airflow is accomplished by a series of rotating blocker doors which, upon placement of the cockpit thrust reverser levers in the proper position by the pilot, are pivoted from a stowed position into a location blocking either the exhaust gas stream or the fan bypass air. It is usually desirable that the thrust reverser blocker doors remain in the stowed position until commanded actuation in response to the movement of the thrust reverser levers.

SUMMARY OF THE INVENTION

The present invention pertains to an airplane thrust reverser system. The system includes reverser means for redirecting air, which is normally propelled in a rearward direction by an airplane engine, in a nonrearward direction. In addition, there are actuator means, including at least two actuator elements, for moving the air redirecting means between a stowed position where the air is not redirected and a deployed position where the air is redirected in the nonrearward direction. In addition, the system includes means for synchronizing operation of the actuator elements so that all portions of the air redirecting means are moved between the stowed position and the deployed position at the same rate. In addition, each actuator element includes (i) a piston for moving the air redirecting means between the deployed and stowed positions, and (ii) an actuator gear which engages the piston and the synchronizing means. Furthermore, there are means for engaging the synchronizing means so as to prevent movement of the actuator gear and the piston therewith.

BRIEF DESCRIPTION OF THE DRAWINGS

These and other features of the present invention will be discussed in more detail in the following Detailed Description in conjunction with the attached drawings, in which:

FIG. 7 is side sectional view of the thrust reverser actuator shown in FIGS. 5 and 6;

DETAILED DESCRIPTION

Figure 1:
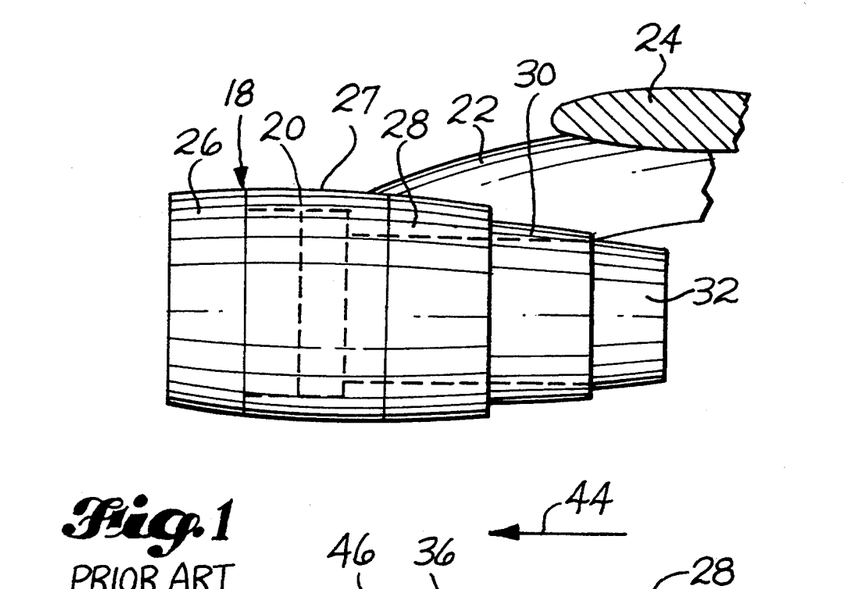
FIG. 1 is a side view of a conventional nacelle and strut.

Referring first to FIG. 1 there is shown a conventional aircraft nacelle indicated at 18 which includes a jet engine, such as a Pratt & Whitney PW4000, indicated at 20 (shown in hidden lines) supported by a strut 22 on a wing 24 (only a portion of which is shown). The nacelle 18 includes a nose cowl 26, a fan cowl 27, a thrust reverser sleeve 28, a core cowl 30 and nozzle exhaust 32. Although some of these components are made up of two mirror image parts split vertically in a clamshell arrangement, each component will be referred to herein as being one piece.

Figure 2:
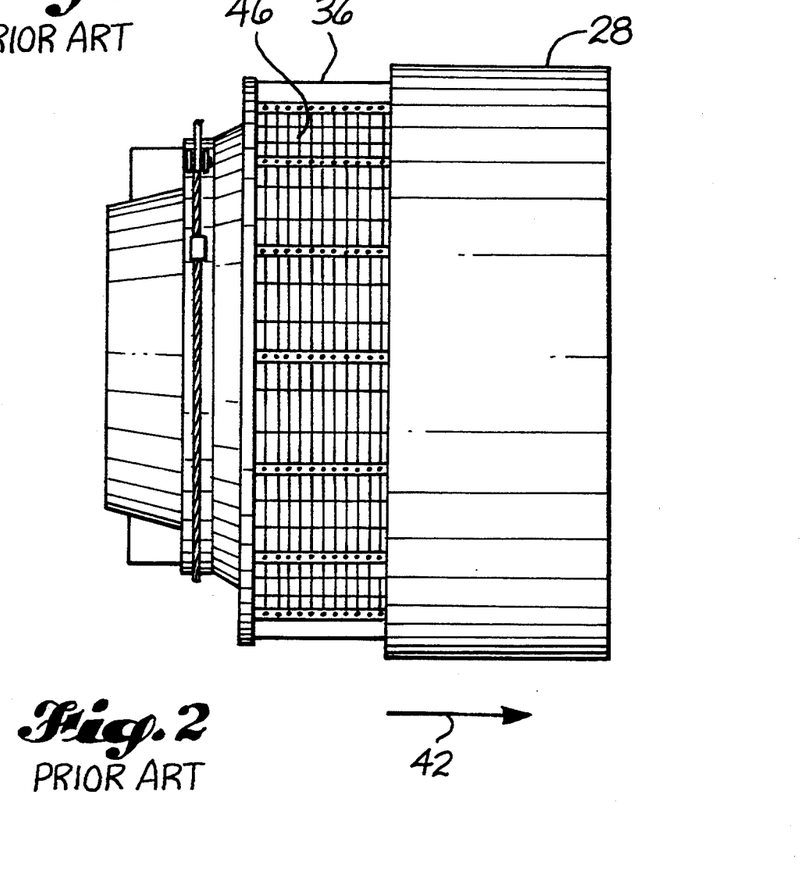
FIG. 2 is a side view of a conventional thrust reverser system.
Figure 3:
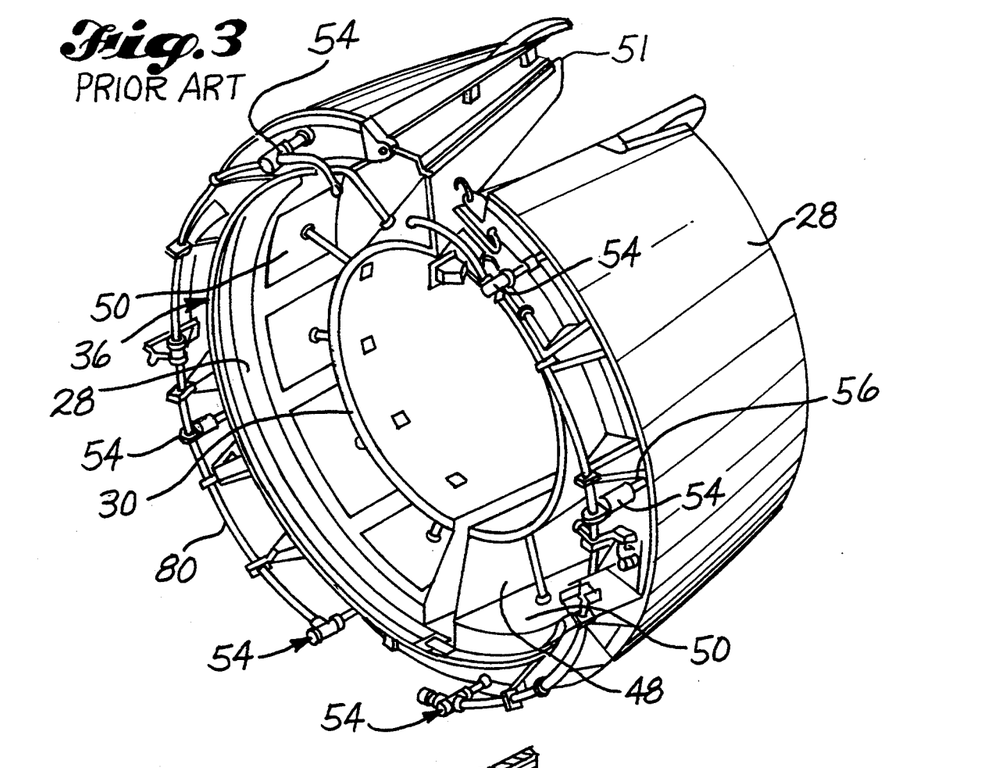
FIG. 3 is an isometric view of a conventional thrust reverser system.

As shown in more detail in FIGS. 2 and 3, the thrust reverser system includes an inner duct (fan duct cowl) 36 and outer sleeve 28. The sleeve 28 translates in an aft direction indicated by an arrow identified by a number 42 in FIG. 2, and a forward direction indicated by an arrow identified by a number 44. When the thrust reverser is deployed, the translating sleeve 28 moves aft from a "stowed" position shown in FIG. 1 to a "deployed" position shown in FIG. 2. In this process, cascade vanes 46 (FIG. 2) mounted to a thrust reverser support structure are uncovered. Vanes 46 are slanted in a forward direction so that during thrust reverser operation, fan air from the engine is re-directed forward through the vanes to aid in stopping the airplane.

Air driven aft by the engine fan flows along an annular duct 48 (FIG. 3) formed by the fan duct cowl 36 and the thrust reverser sleeve 28. Movement of the sleeve 28 in the aft direction, causes blocker doors 50 to pivot from their stowed positions (shown in FIG. 3) to their deployed positions (not shown) where the doors are positioned to block rearward movement of the air through duct 48. In this manner all rearward movement of the engine fan air is redirected forward through the cascade vanes 46.

Figure 4:
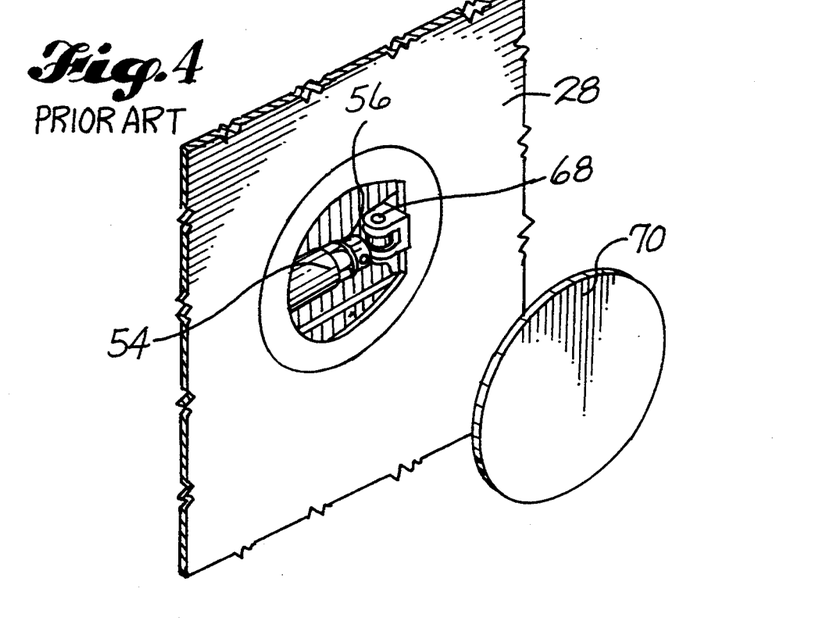
FIG. 4 is a partial view of a conventional thrust reverser sleeve showing an access port located on the sleeve.
Figure 5:
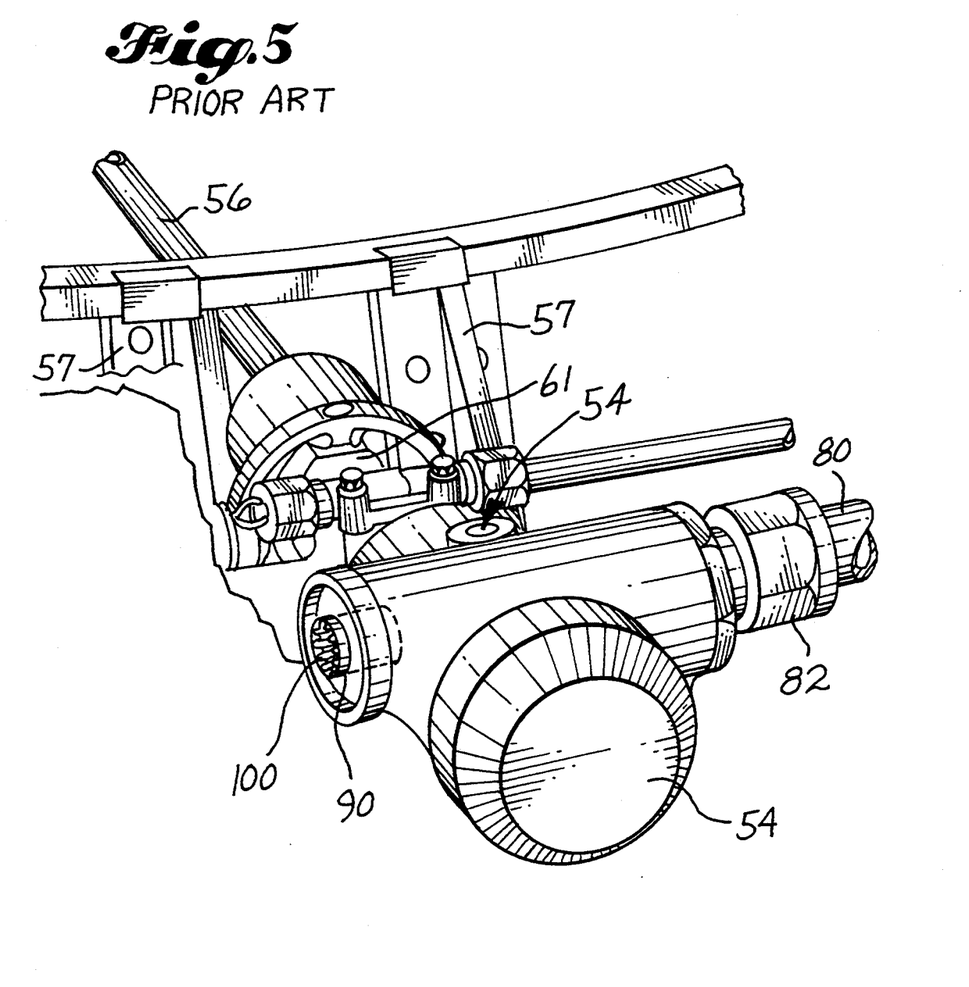
FIG. 5 is an isometric view of a conventional thrust reverser actuator.
Figure 6:
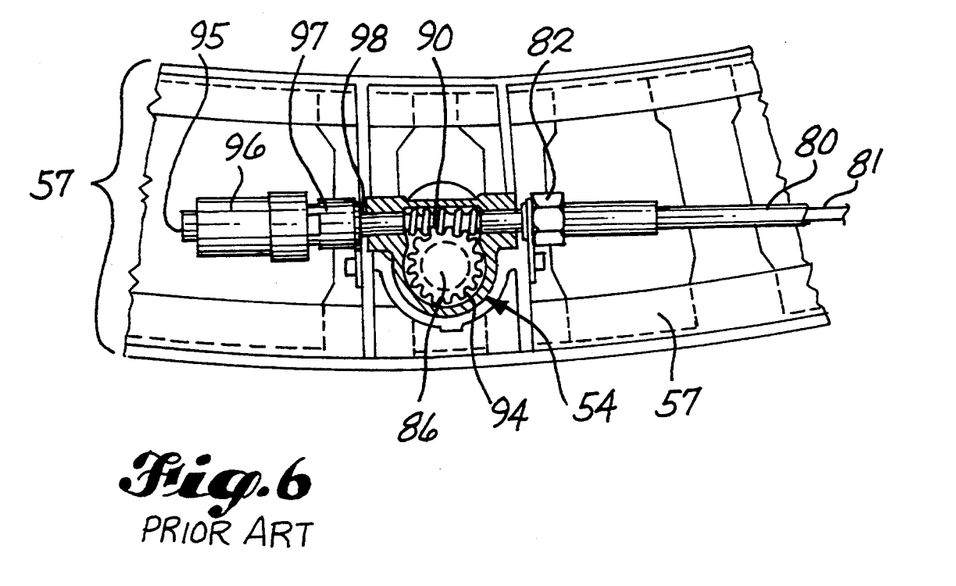
FIG. 6 is a side view of the conventional thrust reverser actuator shown in FIG. 5.
Figure 8:
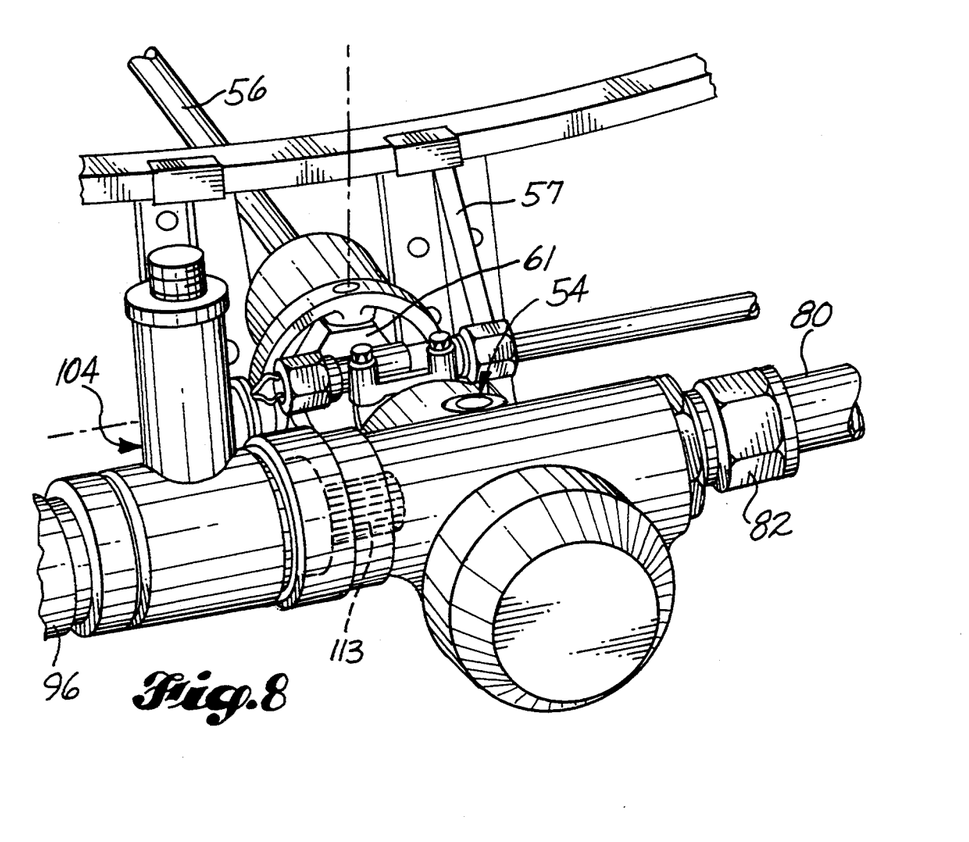
FIG. 8 is an isometric view of a thrust reverser actuator employing the mechanical lock of the present invention.

Movement of the sleeve 28 is guided along a pair of parallel tracks 51 (FIG. 3) mounted to the top and bottom of the fan duct cowl 36 in a fore and aft direction. The sleeve 28 is moved between the stowed and deployed positions by means of a number of hydraulic actuators indicated at 54 (FIG. 3), each having an actuator rod 56 which is connected to the sleeve 28. More specifically, as shown in FIGS. 5 and 6, each actuator 54 is connected to a structural torque box 57 via a gimbal mount 61 thereby allowing the actuator to accomodate lateral variances in sleeve motion. As shown in FIG. 4, the actuator rod 56 is located inside the aerodynamic surface of sleeve 28 and is connected to the sleeve 28 by a ball joint 68. The ball joint 68 is accessible by removing a panel 70 which is bolted to the exterior surface of the sleeve 28.

In operation, when the thrust reverser is commanded by the pilot to the deployed position, the actuator rod 56 (FIG. 5) extends in the aft direction. Conversely, when the thrust reverser is commanded by the pilot to move to the stowed position, the actuator rod 56 retracts in the forward direction. In an exemplary embodiment, the actuator 54 is a thrust reverser actuator currently installed on Boeing 767 airplanes.

As shown in FIG. 7, each actuator 54 includes a double acting piston 72 which is extended in the rightward direction (with reference to FIG. 7) by hydraulic pressure acting against a face 74 of the piston 72. Retraction of the piston 72 and the thrust reverser sleeve therewith is accomplished by relieving hydraulic pressure from the piston face 74, so that hydraulic pressure acting against an opposing face 76 of the piston causes it to move in the leftward direction. The piston 72 is connected to the actuator rod 56 which in turn is connected to the thrust reverser sleeve 28 in the manner described previously.

In the exemplary embodiment, each thrust reverser sleeve is driven by three of the actuators 54 (FIG. 3). It is important that each actuator 54 extend and retract the sleeve at the same rate to avoid causing the sleeve to bind along the tracks 51. To accomplish this, operation of each of the three actuators 54 is synchronized by means of an interconnecting synchronizing shaft 80. The sync shaft 80 (FIGS. 5 and 6) is a tube having a stationary outer sleeve and an internal rotating flexible shaft 81 which synchronizes motion of the three actuators. The outer sleeve of the sync shaft 80 is connected to the actuator 54 by a swivel coupling 82.

In order to explain this synchronizing operation in greater detail, reference is made to the section view of the actuator 54 in FIG. 7. As shown, the piston 72 is connected via a non-rotating threaded drive nut 84 to a rotating Acme screw 86. As piston 72 translates the drive nut 84 moves with it. Translating movement of the drive nut 84 along the Acme screw 86 causes the Acme screw to rotate thereby converting translational movement into rotational movement. Synchronizing operation is further accomplished by a worm gear 90 (FIG. 6) located inside the actuator housing which engages a spur gear 94 which in turn is mounted to the end of the Acme screw 86. Furthermore, the internal sync shaft 81 has a splined end tip which is positioned inside a slot (not shown) in the right end of the worm gear 90.

Referring again to FIG. 7, extension and retraction of the thrust reverser sleeve results in rotation of the Acme screw 86 and rotary gear 94 therewith. This causes rotation of the worm gear 90 in a manner that a high torque and low rotational speed input from the Acme screw 86 is converted by the worm gear 90 to a low torque and high rotational speed output to the sync shaft. In the event one of the actuators 54 attempts to move the thrust reverser sleeve at a different rate than the other actuators, their rates are equalized via the common sync shaft and through the respective worm gears, spur gears and Acme screws of the actuators. This results in uniform translation of the thrust reverser sleeve.

In order to allow the thrust reverser sleeve 28 to be moved between the stowed and deployed positions for maintenance purposes while the airplane is on the ground, a manual drive clutch mechanism 96 shown in FIG. 6 is attached to the left end of the actuator. The manual drive clutch 96 includes a socket (not shown) for receiving a square drive tool (also not shown) in its left end 95. The manual drive clutch 96 is connected by a female coupling 97 to a threaded male connector 98 at the left end of the actuator. The drive clutch 96 includes a drive shaft 99 (FIG. 10) having a square-ended tip which extends in a rightward direction from the clutch and which fits inside an end slot 100 (FIG. 5) of the actuator worm gear 90.

In operation, when the square drive tool is inserted into the manual drive clutch in a rightward direction, the clutch is engaged thereby allowing the square drive tool to drive the worm gear 90 (FIG. 6), which in turn drives the spur gear 94, Acme screw 86 to translate the thrust reverser sleeve.

Having described the operation of the conventional thrust reverser, attention now will be turned to the mechanical lock of the present invention indicated at 104 (shown in FIGS. 8 through 11) which is connected to the actuator 54 in place of the drive clutch 96. In turn, the drive clutch 96 is connected to the left end of the mechanical lock 104. In the present discussion, like elements described previously will be identified in FIGS. 8 through 11 by like numerals.

The purpose of the mechanical lock 104 is to prevent uncommanded translation of the thrust reverser sleeve. The mechanical lock 104 includes a cylindrical housing 106 (FIG. 10) having an internal cylindrical passageway 108. Axially aligned with the centerline of the passageway 108 is a cylindrical shaft 110 having an eight-pointed splined slot 112 at its left end for receiving therein the splined end tip 99 of the clutch mechanism 96 described previously. At the right end of the shaft 110 is a splined tip 113 which is inserted in the socket 100 (FIG. 5) of the actuator worm gear 90. Mounted centrally on the center shaft 110 (FIGS. 9 and 10) is a lock wheel 114 having a cylindrical outer surface 116.

Figures 9, 10, 11:
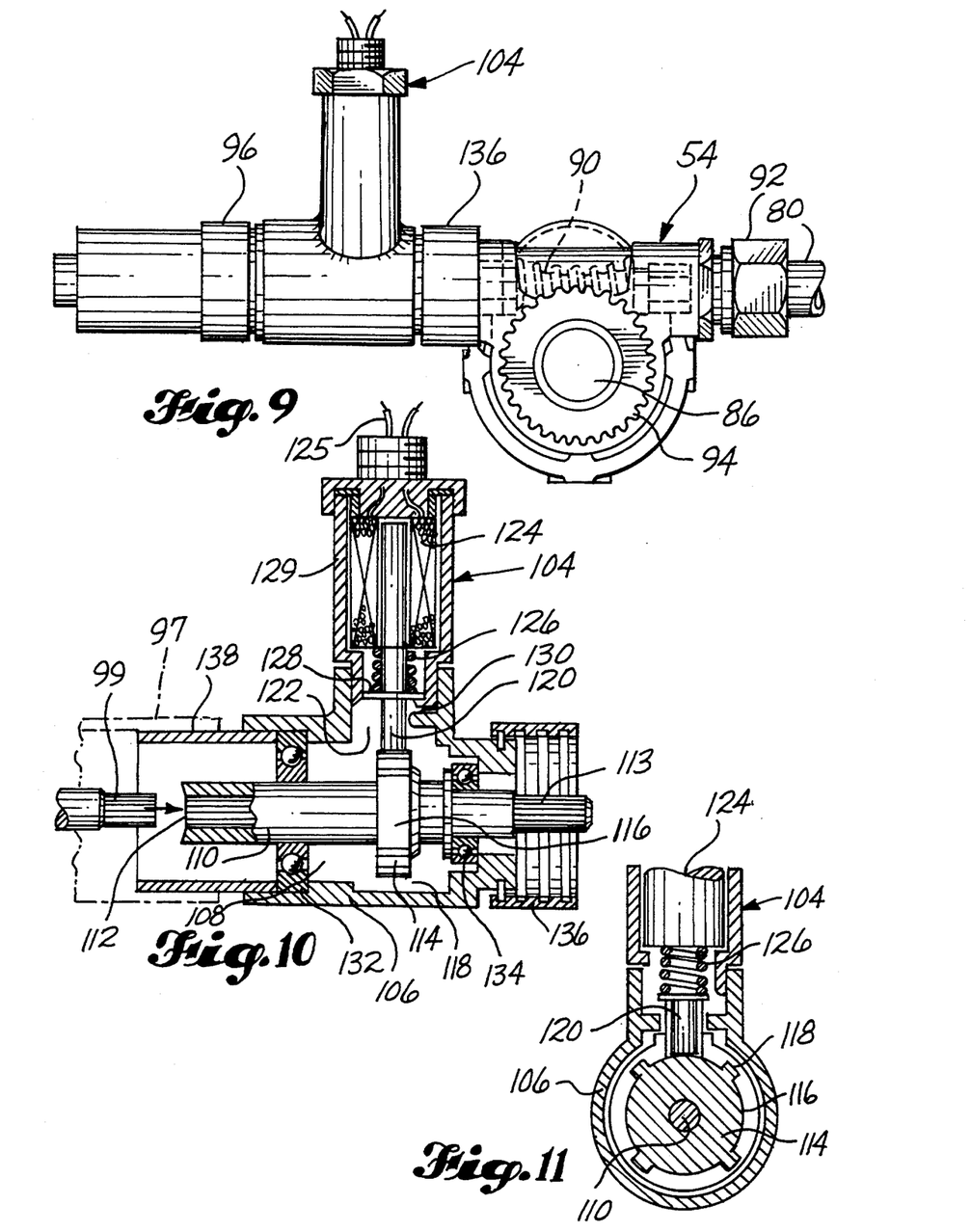
FIG. 9 is a side view of the thrust reverser actuator and mechanical lock shown in FIG. 8.
FIG. 10 is a side sectional view of the mechanical lock of the present invention.
FIG. 11 is a partial end sectional view of the mechanical lock of the present invention.

Extending from the locking wheel surface 116 at equally spaced intervals are four square teeth 118 (FIG. 11) whose rotational path is blocked by a locking pin 120 when the device is de-energized and the locking pin is in a down/locking position shown in FIGS. 10 and 11. More particularly, the locking pin 120 extends through an opening 122 in the upper wall of the housing 106. It should be appreciated that the direction of the shear force created by the rotation of the locking wheel 114 and shaft 110 therewith is orthogonal to the locking/unlocking movement of the locking pin thereby minimizing the forces required to extend and retract the locking pin 120.

In operation, when the locking pin 120 is in the down/locking position it prevents rotational movement of the shaft 110 thereby preventing rotation of the worm gear 90 (FIG. 9), spur gear 94, and the Acme screw 86. This, in turn, prevents translational movement of the drive nut 84 (FIG. 7), the piston 72 and the thrust reverser sleeve 28 therewith, thereby preventing thrust reverser sleeve motion.

Movement of the locking pin 120 (FIG. 10) between the locked position and an unlocked position (where the pin 120 is above and clear of the teeth 118) is controlled by an electrically operated solenoid 124 through which the upper end of the locking pin 120 extends. Electrical control is initiated at the cockpit (not shown) via conventional airplane thrust reverser control circuits and is transmitted by electrical wires 125 to the solenoid 124. Control of the solenoid may be accomplished in a conventional manner and is not part of the present invention. It should be appreciated that other means for controlling movement of the locking pin 120, such as hydraulic or electrohydraulic means, may be utilized.

A spring 126 biases the locking pin 120 in the locked position when the solenoid is not energized. The spring 126 is positioned between the bottom surface of the solenoid 124 and a shoulder 128 attached to the locking pin 120.

As shown in FIG. 10, the solenoid 124 is located inside a columnar housing 129 extending upward from the lower housing 106. The column 129 includes a ledge 130 which supports the shoulder 128 and the locking pin therewith when it is in the locking position.

When the thrust reverser is being deployed or stowed, the solenoid 124 is energized causing the locking pin 120 to move upward against the force of the spring 126 thereby allowing the locking wheel 114 and the shaft 110 to rotate freely. When thrust reverser motion is completed, electrical power to the solenoid is terminated and the spring 126 moves the locking pin 120 into the locking (down) position thereby preventing rotation of the locking wheel 114 and the shaft 110.

In the present invention, the locking loads generated by the locking wheel 114 are very small because of the low torque transferred from the worm gear 90. This allows the mechanical lock 104 to be smaller and lighter in weight than locks attached directly to the thrust reverser sleeve.

Still referring to FIG. 10, the central shaft 110 is supported in the housing toward the left end of the housing by bearing 132 and toward the right end of the housing by bearing 134. To allow convenient attachment of the mechanical lock to the thrust reverser actuator, the right end of the housing 106 includes a collar 136 which is rotatable with respect to the housing. The collar 136 is internally threaded to allow it to be screwed onto the threaded male fitting 98 (FIG. 6) extending from the left end of the thrust reverser actuator. On the other hand, the left end of the housing 106 includes an externally threaded male fitting 138 which allows the swivel coupling 97 (FIG. 6) located at the right end of the manual clutch mechanism 96 to be screwed thereon.

An alternate configuration of the sync lock mechanism incorporates the manual drive mechanism within housing 106.

What is claimed is:

1. An airplane thrust reverser system comprising:
   a. means for redirecting air which is propelled in a rearward direction by an airplane engine in a non-rearward direction;
   b. actuator means, for moving the air redirecting means between a stowed position where the air is not redirected and deployed position where the air is redirected in the nonrearward direction;
   c. means for automatically moving the actuator means, in response to an input, so as to move the air redirecting means between the stowed position and the deployed position;
   d. means, which are engaged with the actuator means, for synchronizing operation of the air directing means between the stowed position and the deployed position;
   e. means for manually moving the actuator means, the manually moving means including means for receiving a tool which is manipulated by an operator outside of the airplane when the airplane is on the ground in a manner that movement of the tool by the operator in the tool receiving means causes movement of the actuator means so as to move the air redirecting means between the stowed and deployed positions;
   f. first means which is engaged between the manually moving means and the synchronizing means such that movement of the manually moving means by the operator causes movement of the first means so as to cause movement of the synchronizing means which in turn causes movement of the actuator means and the air directing means therewith; and
   g. second means which is movable between a first position for stopping movement of the first means thereby stopping movement of the synchronizing means and actuator means therewith, and a second position for allowing movement of the first means thereby allowing movement of the synchronizing means and the actuator means therewith.

2. The system as set forth in claim 1 wherein:
   a. the first means includes a drive shaft which is engaged with the synchronizing gear for movement therewith; and
   b. the manually moving means includes a drive shaft which is connected to the drive shaft of the first means such that movement of the manually moving means drive shaft in response to the movement of the tool causes movement of the first means drive shaft which in turn causes movement of the actuator means so as to move the air redirecting means between the stowed and deployed positions, and
   c. the second means engages the first means drive shaft when in the first position thereby preventing movement of the synchronizing gear and the actuator means therewith so as to prevent movement of the air redirecting means.

3. The system as set forth in claim 1 wherein:
   a. the actuator means includes at least two actuator elements which are connected to separate locations of the air redirecting means; and
   b. the synchronizing means includes means for synchronizing movement of the actuator elements so that the separate locations of the air directing means are moved between the stowed position and the deployed position.

4. The system as set forth in claim 3 wherein each actuator element further includes (i) a piston for moving the air redirecting means between the stowed and deployed positions, and (ii) an actuator gear which engages the piston and the synchronizing means.

5. The system as set forth in claim 1 wherein:
   a. the synchronizing means includes a synchronizing gear which engages the actuator means;
   b. the first means includes a drive shaft which engages the synchronizing gear for movement therewith; and
   c. the second means includes means for preventing the movement of the drive shaft, the preventing means being moveable between a first unlocked position not in engagement with the drive shaft and a second locked position in engagement with the drive shaft in a manner to prevent movement of the drive shaft thereby preventing movement of the synchronizing gear and actuator means therewith.

6. The system as set forth in claim 3 wherein the actuator means includes means for moving the actuator elements so as to move the air redirecting means between the stowed position and the deployed position.

7. The system as set forth in claim 6 wherein the actuator element moving means includes means for receiving a hydraulic input to move the actuator elements.

* * * * *